Dec. 22, 1970    G. FIORI    3,548,475
CUTTING TOOL FOR LATHES
Filed June 14, 1968    4 Sheets-Sheet 3
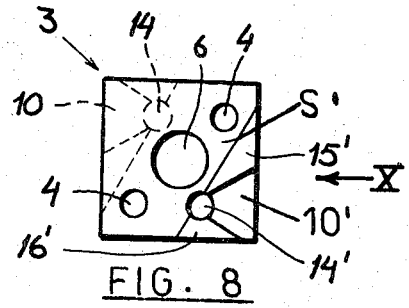
FIG. 8
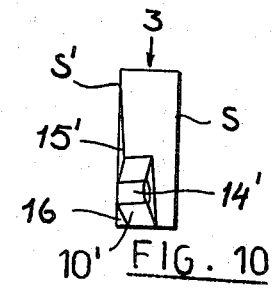
FIG. 10
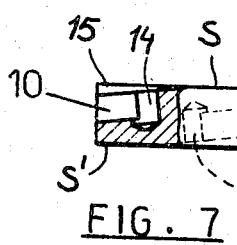
FIG. 7
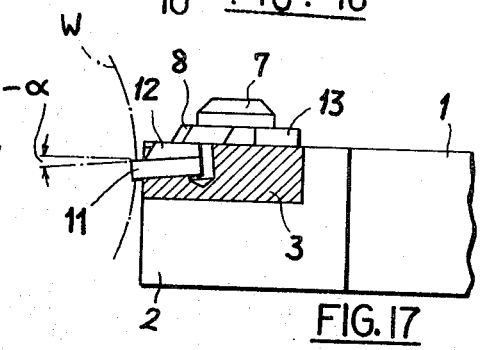
FIG. 17
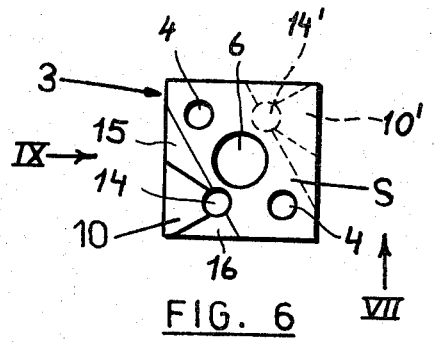
FIG. 6
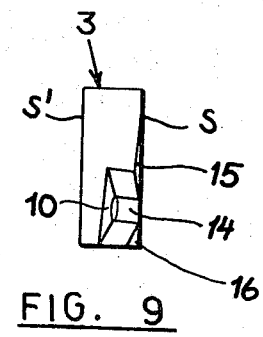
FIG. 9
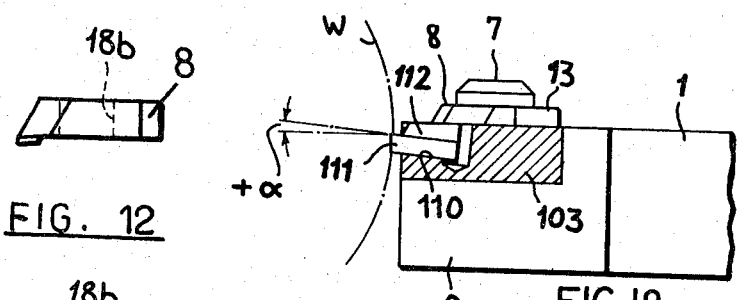
FIG. 12    FIG. 11    FIG. 18
INVENTOR:
Giorgio Fiori
BY
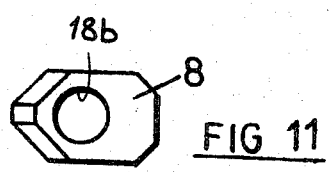
Karl J. Ross
ATTORNEY Dec. 22, 1970   G. FIORI   3,548,475
CUTTING TOOL FOR LATHES
Filed June 14, 1968   4 Sheets-Sheet 4

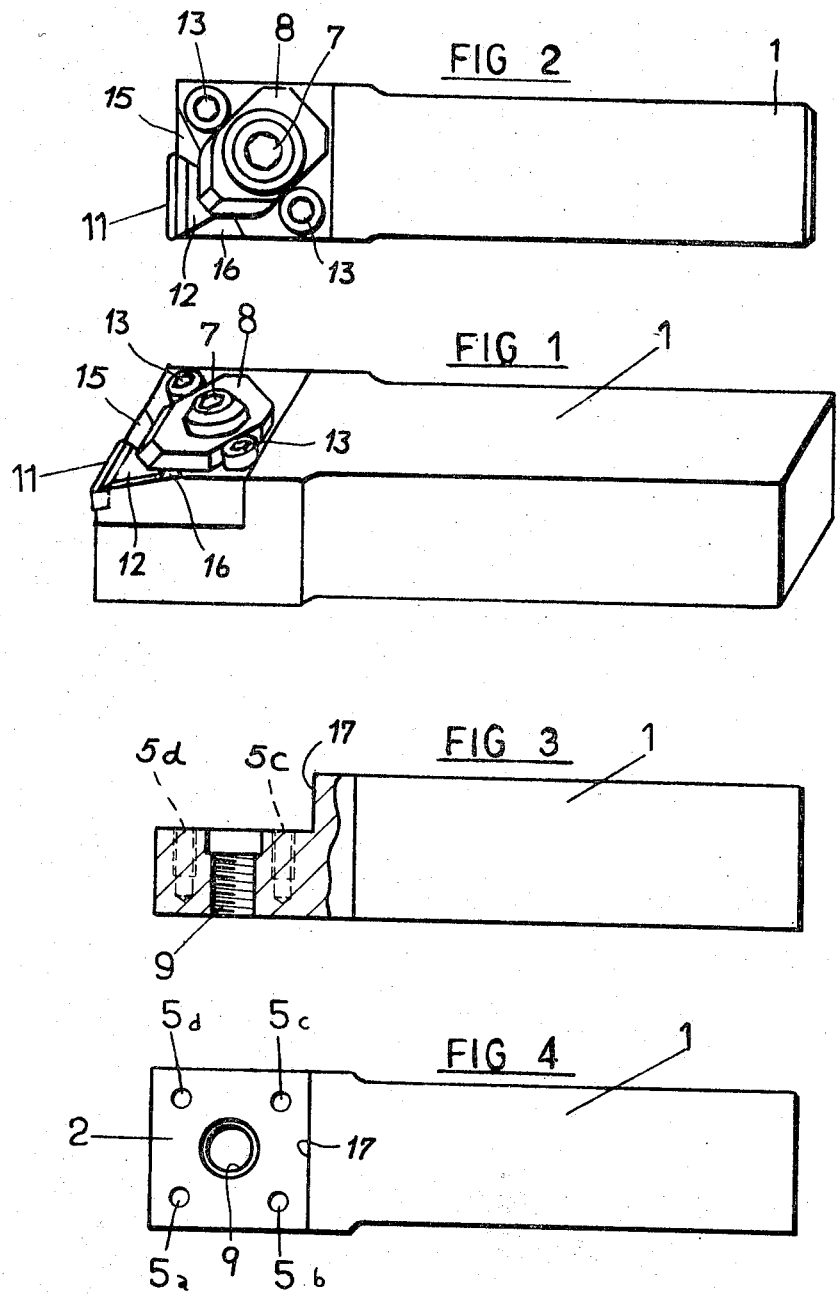

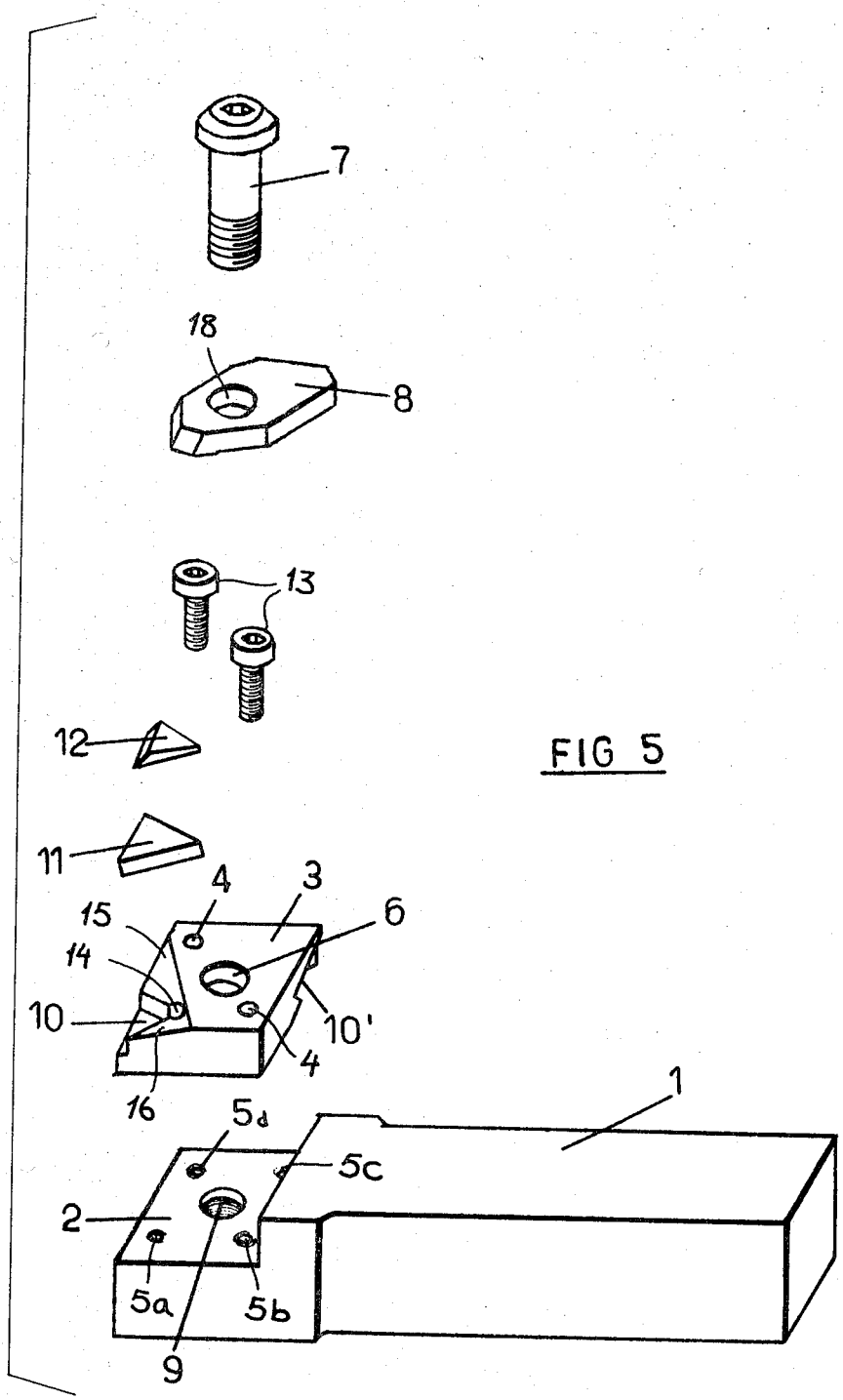

INVENTOR:
Giorgio Fiori

BY Karl J. Ross
ATTORNEY

United States Patent Office 3,548,475
Patented Dec. 22, 1970

3,548,475
CUTTING TOOL FOR LATHES
Giorgio Fiori, Como, Italy, assignor to USAP Utensileria Speciale Alta Presisione S.p.A., Como, Italy, a corporation of Italy
Filed June 14, 1968, Ser. No. 737,151
Claims priority, appplication Italy, June 21, 1967, 804,449
Int. Cl. B26d 1/00
U.S. Cl. 29—96    8 Claims

ABSTRACT OF THE DISCLOSURE

A lathe cutting tool has a shank to which a bit-holder block having two differently disposed bit seats can be fastened in different positions. A bit with a chip breaker can be clamped in either seat to attack a workpiece from different directions.

---

My invention relates to a cutting tool for lathes.

A variety of cutting tools are needed on a lathe for different machining operations. Thus, in order to perform the basic operations of facing and turning with either right-hand or left-hand feed and either positive or negative rake angle, eight different tools are conventionally required, i.e., one set of four tools with positive rake and one set of four tools with negative rake. The changes from right-hand to left-hand feed and from facing to turning, or vice versa, are often made in the course of machining a single workpiece; the switch between positive and negative back rake, however, is usually necessary only with a change of workpiece or bit, e.g., negative rake for a sintered-carbide bit working a steel casting and positive rake for a high-speed steel bit working cast iron.

The general object of my present invention is to provide a versatile cutting tool adapted to be used for several machining operations with different directions of attack, such as facing and turning with right-hand and left-hand feed, thereby materially reducing the unproductive switchover time and minimizing the number of bit holders to be held in stock by a machine shop.

A cutting tool according to my invention, designed to realize this object, has a shank formed with a preferably recessed land to which a removable bit-holder block can be fastened in any of several different working positions. This block, which preferably has a polygonal outline so that different sides thereof can come to rest against a shoulder bounding the recessed land, is formed with at least one seat to receive a tool bit which can be held therein at a desired angle of attack with reference to a workpiece to be machined. With the seat formed as a cutout open toward a face of the block, the latter and the bit can be clamped in position by a single retaining member overlying the cutout and bearing upon the bit, preferably through a chip breaker which may be wedge-shaped to compensate for the inclination of the bit.

The bit holder advantageously has at least one such seat on each of its two major faces, including preferably two seats at diametrically opposite locations with reference to a bolt hole or equivalent mounting formation about which it may be rotated relatively to the supporting tool shank. If the land and the block have registering outlines of substantially square configuration, the block may occupy four different working positions for the performance of as many distinct machining operations.

The above and other features of my invention will become more clearly apparent from the following detailed description given with reference to the accompanying drawing in which:

FIG. 1 is a perspective view of a lathe tool according to my invention, set up for a right-hand facing operation;

FIG. 2 is a top view of the tool shown in FIG. 1;

FIG. 3 is a side view of the same tool, partly in section;

FIG. 4 is a top view of the shank of the tool shown in FIGS. 1–3;

FIG. 5 is an exploded view of the tool;

FIG. 6 is a top view of a bit-holder block forming part of the tool;

FIG. 7 is a side view, partly in section, of the block taken in the direction of arrow VII in FIG. 6;

FIG. 8 is a bottom view of the block of FIGS. 6 and 7;

FIG. 9 is a side view of the block taken in the direction of arrow IX in FIG. 6;

FIG. 10 is a side view similar to FIG. 9 but showing the block from the opposite side as indicated by arrow X in FIG. 8;

FIG. 11 is a top view of a clamp member forming part of the tool;

FIG. 12 is a side view of the same clamp member;

FIG. 17 is a fragmentary side view of the tool, shown partly in section; and

FIG. 18 is a view similar to FIG. 17, showing a modification of the tool.

Figures 13, 15:
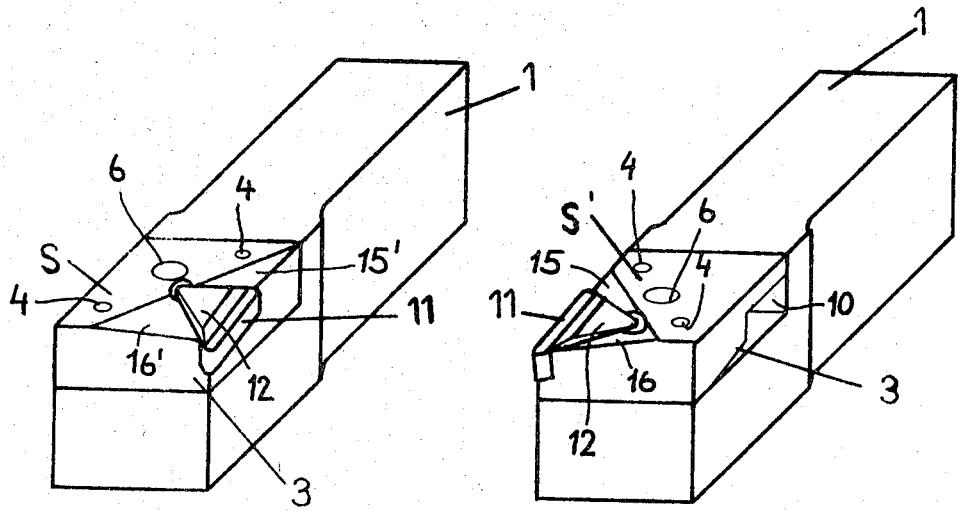
FIGS. 13–16 are isometric views of the tool shown in its different working positions, with parts omitted for clarity.

The tool illustrated in FIGS. 1–17 has a shank 1 adapted for mounting on a tool post, not shown, of a conventional lathe. Shank 1 is formed with a square recess 2 constituting a land for the mounting of a bit-holder block 3 of identical outline on the front end of the shank. Locator screws 13 passing through bores 4 in the holder block 3 are selectively threadable into either of two pairs of diametrically opposite bores 5a, 5c and 5b, 5d located near the corners of land 2, at equal distances from a threaded bore 9.

The block 3 itself is formed on opposite surfaces S, S' with two triangular cutouts 10, 10' intersected by a common diagonal, the other diagonal passing through a pair of mounting holes 4 registering with either pair of threaded bores 5a, 5c or 5b, 5d in different working positions. The inside corner of each seat 10, 10' merges with a respective bore 14, 14' which receives a point of a generally triangular bit 11 having a cutting edge remote from that point. If, as shown here, the bit has the shape of an equilateral triangle (e.g., of sintered carbide), each of its three corners will be usable as a cutting edge, thus providing a total of six working points. Block 3 has an unthreaded center hole 6 registering with bore 9, the latter serving as a mounting formation for helping secure the block in position.

A plate-shaped clamp member 8 having a central hole 18 is fastened to shank 1 by a bolt 7 passing through the holes 18 and 16 in threaded engagement with bore 9. The hole 18 is slightly larger than the shaft of the bolt 7 to allow some canting of the member 8 in relation to the block 3, whereas the bore 6 fits the bolt 7 closely so that this bolt 7 together with screws 13 precisely locates the block 3 in the recess 2 in contact with a shoulder 17. A chip breaker 12, inserted between the plate 8 and the bit 11, is slightly wedge-shaped to compensate for the slope of the bottom of seat 10 or 10' which determines the back-rake angle −α (here negative) indicated in FIG. 17, this figure illustrating the working point of bit 11 in contact with a rotating workpiece W.

Each of the two seats 10 and 10' is flanked by a pair of ramp surfaces 15, 16 and 15', 16' giving clearance to the portion of pressure plate 8 which overlies the wedge-shaped spacer 12 to hold the bit 11 in position while clamping the block 3 to the shank 1.

FIG. 18 shows the shank 1 fitted with a block 103 whose seats 110 (only one shown) are so inclined as to impart a positive back-rake angle $+\alpha$ to a bit 111 attacking a workpiece W while being clamped by bolt 7 and plate 8 through the intermediary of a modified chip breaker 112.

The tool is set up for use as follows:

When the tool is to be used for right-hand turning (FIG. 13), the block 3, with its face S′ up, is clamped onto the land 2 by screws 13 in bores 5b and 5d of the shank 1, the wide mouth of cutouts 10 and 10′ extending parallel to the longitudinal direction of the shank. The bit 11 is then clamped by plate 8 and bolt 7 (omitted in FIGS. 13–16) so that its exposed side extends along the right-hand side of the tool (as viewed in this figure).

For left-hand facing (FIG. 14) the block 3 again has its face S′ up but the screws 13 now engage in the holes 5a and 5c, the block being thus turned through 90° with reference to FIG. 13 so that the exposed bit edge lies near the left-hand front corner of the tool and extends transversely to the shank 1.

Figures 14, 16:
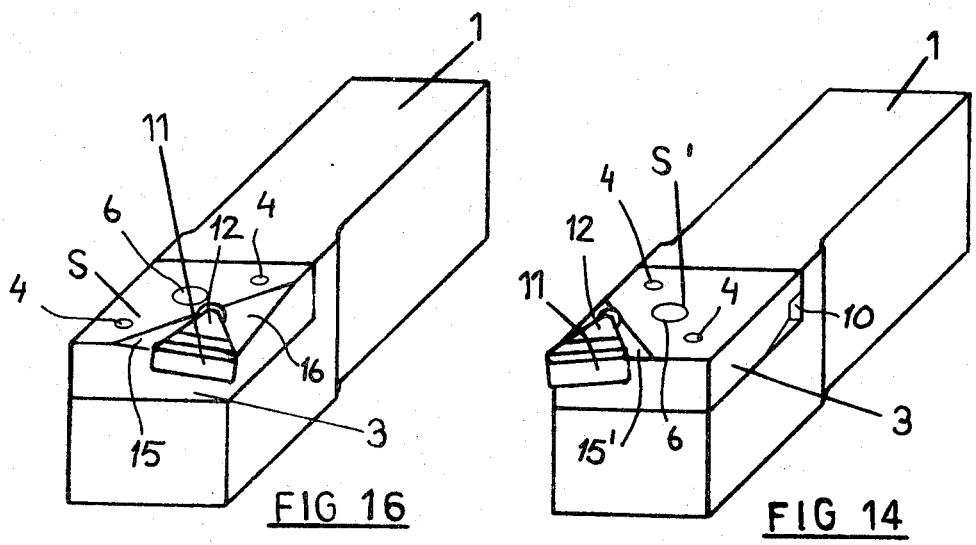

For left-hand turning (FIG. 15) the block 3 is reversed, with its face S up and the screws 13 are threaded through the bores 4 into the holes 5a and 5c, as in FIG. 14. The exposed edge of bit 11 now extends along the left-hand side of the tool.

For right-hand facing (FIG. 16) the block 3 is rotated through 90° from the position of FIG. 15, the screws 13 now engaging in the holes 5b and 5d while the cutting edge of the bit faces in the direction opposite that of FIG. 14.

The four above-mentioned tool configurations all give a negative back rake if the bit 11 is an orthogonal prism, as shown. Substitution of the block 103 for the block 3 adapts the tool for working with positive back rate.

Although the two seats 10 and 10′ have been shown to be of identical shape, it will be apparent that they could also be made mutually different. This and other modifications readily apparent to persons skilled in the art are intended to be embraced within the spirit and scope of my invention as defined in the appended claims.

I claim:
1. A tool for a lathe, comprising:
    a shank having an end provided with a land and with a mounting formation;
    a block with two parallel major surfaces removably held on said land, said land and said block being of generally square outline and substantially registering with each other, said block being formed on each of said major surfaces with a seat for accommodating a tool bit; and
    fastening means engageable with said mounting formation to hold said block fixed to said shank in any one of several working position in which said seats face in different directions.

2. A tool as defined in claim 1 wherein said seats are disposed along a common diagonal of said square outline, said block being provided with locator means disposed near the other diagonal of said outline for retaining said block in any of said working positions.

3. A tool as defined in claim 2 wherein said land is provided with four threaded bores near respective corners of said outline, said block having two throughgoing holes along said other diagonal registering with respective pairs of said bores in different working positions, said locator means comprising screws which pass through said holes and threadedly engage in said holes.

4. A tool as defined in claim 1 wherein each seat forms a cutout in said block open on the respective major surface thereof, said fastening means including a pressure plate and clamping means for holding said plate in a position overlying said cutout.

5. A tool as defined in claim 4 wherein said cutout has substantially the shape of an equilateral triangle.

6. A tool as defined in claim 5 wherein said fastening means comprises a bolt, said mounting formation being a threaded central bore matingly engaged by said bolt, said plate and said block being provided with registering holes traversed by said bolt.

7. A tool as defined in claim 4, further comprising a chip-breaking spacer element interposable between said plate and a bit received in said cutout.

8. A tool as defined in claim 1 wherein said land is a recess bounded on one side by a shoulder, said block having different sides resting against said shoulder in its several working positions.

References Cited
UNITED STATES PATENTS

| | | | |
|---|---|---|---|
| 2,808,638 | 10/1957 | Filippi | 29—96 |
| 2,949,662 | 8/1960 | Cook et al. | 29—96 |
| 3,246,382 | 4/1966 | Zierden | 29—96 |

HARRISON L. HINSON, Primary Examiner